Aug. 30, 1955    W. T. NANCE ET AL    2,716,340
APPARATUS FOR MEASURING THE VOLUME OF A BOREHOLE
Filed Oct. 20, 1952    3 Sheets-Sheet 1

Inventors: W. T. Nance
C. L. Rabe
By: [signature]
Their Attorney

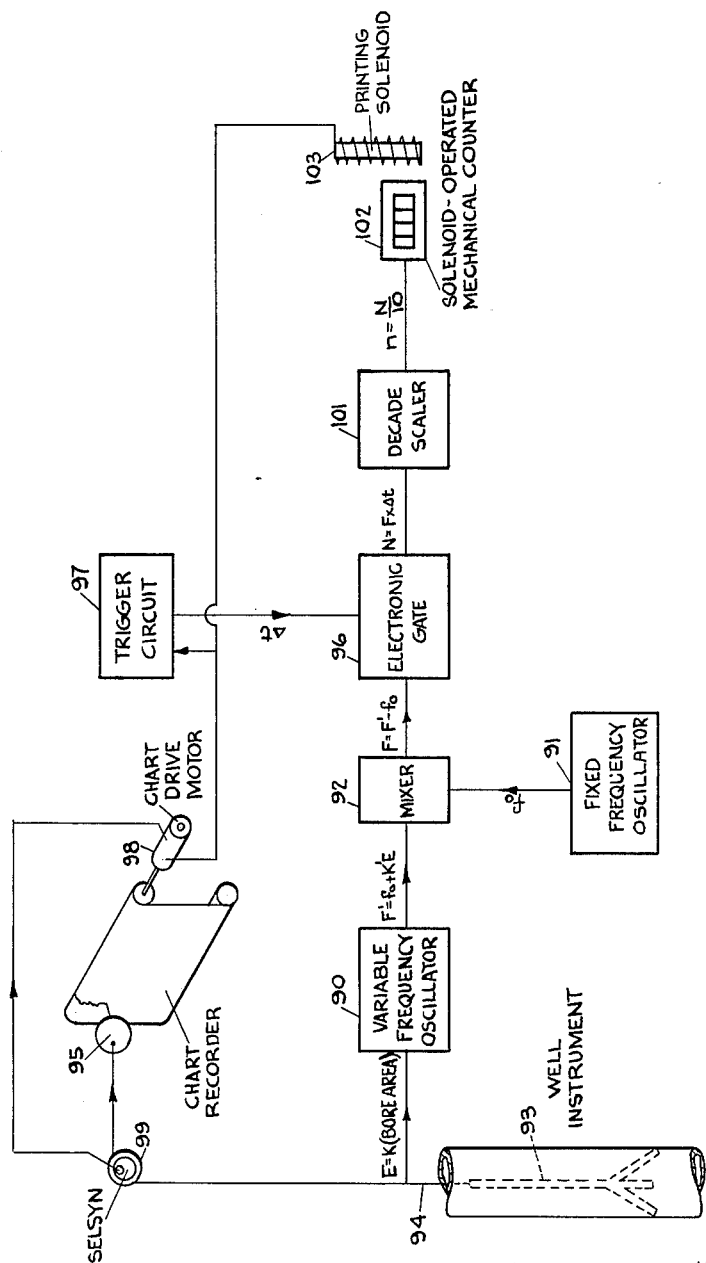

United States Patent Office 2,716,340
Patented Aug. 30, 1955

2,716,340

APPARATUS FOR MEASURING THE VOLUME OF A BOREHOLE

William Tharp Nance, Kilgore, and Charles Leonard Rabe, Houston, Tex., assignors to Shell Development Company, Emeryville, Calif., a corporation of Delaware Application October 20, 1952, Serial No. 315,782

3 Claims. (Cl. 73—149)

This invention relates to well logging operations and pertains more particularly to apparatus for measuring a property of the well borehole or the formations it traverses and integrating the product of a borehole depth interval and borehole or formation property which may be recorded graphically as a function of borehole depth. For purposes of illustration, the apparatus of the present invention will be described with regard to determining the volume of a borehole by measuring the depth and cross-sectional area of the borehole and integrating the product of these measurements.

When well boreholes are drilled through unconsolidated formations, the diameter of the completed borehole is generally larger than the diameters of the drill bits which were employed in drilling. Additionally, the diameter of the completed borehole is not uniform over any considerable depth but is subject to continuous variations caused by the drilling operations. Enlargement of the borehole at various levels may be caused by many factors, for example, erosion due to the flowing stream of drilling fluid and abrasion from the rotating drill string or various drilling tools being inserted and removed from the well during drilling operations.

Therefore, at the end of the drilling operations, but before the well casing has been cemented into place in the borehole, the borehole dimensions and its volume is not accurately known. Since, however, it has been found that a more satisfactory well completion job may be obtained when the volume of the well borehole and hence the amount of cement needed is known, it is the present practice of drilling crews to run an instrument down the uncased borehole to obtain its diametric measurements.

Well calipering devices for measuring the diametric variations of a borehole are well known to the art. While these devices are adapted to measure accurately the diameter of a borehole and to record a continuous log of variations in diameter when run to the bottom of the borehole, many of these devices are not capable of automatically indicating the cross-sectional area of the borehole or integrating the diameter measurements obtained with the depth data in order to obtain the volume of the borehole. At present, it is necessary for an operator to read the recorded log of a calipering device and from it to calculate the volume of the borehole. Since the cross-sectional area of a well borehole may vary constantly throughout the depth of the borehole, volume calculations thereof are both difficult and time consuming, and are also subject to human errors which arise from interpretation of data and their calculation.

It is therefore a primary object of the present invention to provide an apparatus adapted to be lowered into a well borehole for measuring the diameter thereof and automatically indicating and recording at the surface the volume of the borehole.

It is also an object of the present invention to provide an apparatus for continuously integrating the product of a depth interval of a well borehole and any property of the borehole, or the formation which it traverses, which may be recorded graphically as a function of depth.

It is a further object of this invention to provide an apparatus adapted to pass down a borehole for measuring the varying diameter of a borehole and for transmitting to the surface an electrical signal proportional to the diameter thereof, the signal being employed at the surface for continuously calculating and recording the volume of the borehole, from one end thereof, over a plurality of regular or irregular depth intervals.

Another object of the present invention is to provide a continuously recording integrating device adapted to be used with present electrical well calipering equipment for automatically and continuously integrating the product of depth interval and borehole diameter, and recording the results.

A still further object of this invention is to provide apparatus for determining and recording the volume of a well borehole at any depth interval from a diameter and depth log recorded by a well calipering instrument.

These and other objects of this invention will be understood from the following description taken with reference to the drawing, wherein:

Figure 5 is a diagram showing the arrangement of various units or circuits forming an electronic integrating apparatus according to the present invention.

Figure 1:
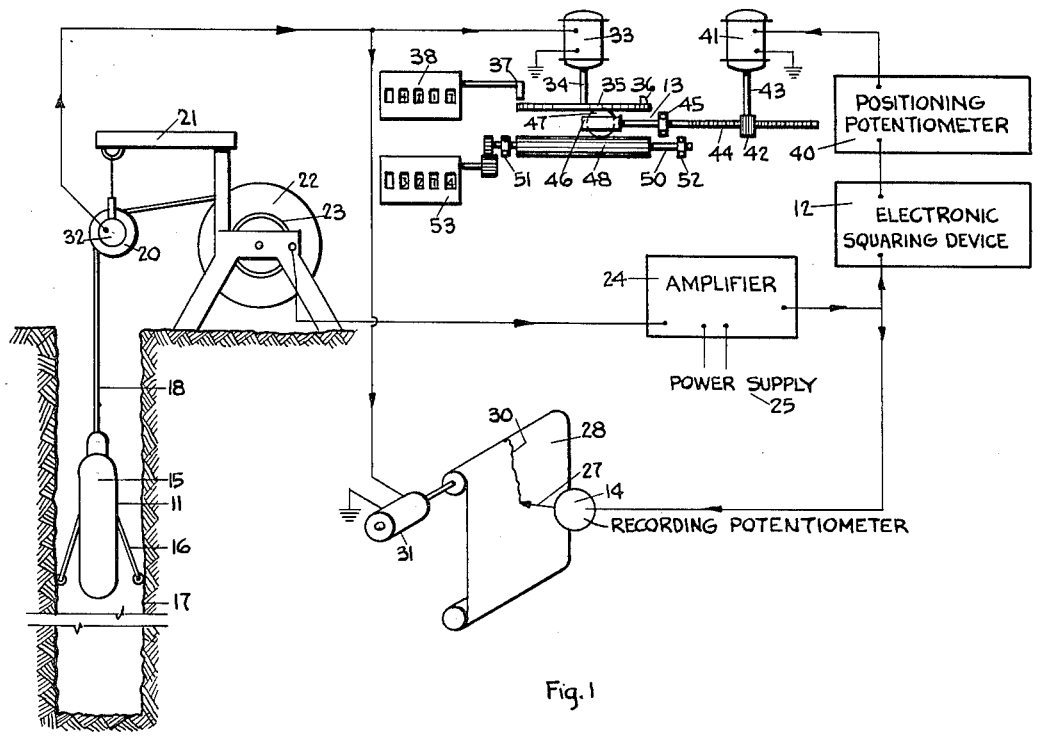
Figures 1 and 4 are schematic diagrams illustrating the principal components of the calculating and recording circuit at the well head when coupled to a well calipering device positioned in a well borehole.

Referring to Figure 1 of the drawing, the present apparatus for calculating borehole volumes may comprise in combination a calipering device 11, signal squaring means 12, an integrating apparatus 13 and, if desired, means for recording the diameter or cross-sectional area of a well borehole, such as a recording potentiometer 14.

The calipering device 11 may be briefly described as a housing 15 provided with a plurality, such as four or more in number, of feeler or caliper arms 16 hinged to the housing 15 and extensible radially therefrom in their operative position so that they are in constant contact with the wall 17 of the well borehole. The caliper arms 16 are also connected to an electrical circuit (not shown) carried within the housing 15 whereby the settings of elements of the circuit are changed as the arms 16 move radially with changes in the diameter of the borehole wall. The output signal from the calipering device 11 is proportional at any instant to the diameter of the borehole wall. The signal is transmitted up an electrical conductor cable 18 by which the calipering device 11 is suspended in the well borehole.

Well calipering devices having outwardly extending arms connected to suitable means for recording the lateral displacement of the ends thereof are well known to the art of well logging and the detailed construction of these devices is described in U. S. Patent 2,267,110 to Kinley et al., issued December 23, 1941, and U. S. Patents 2,497,990 to Huber et al., issued February 21, 1950. Since the design, construction or mode of operation of the calipering device 11 forms no part of the present invention, no detailed description of the calipering device is included here. For purposes of the present invention, any calipering device 11 having an electrical output signal proportional to the diameter of the well borehole may be employed.

The electrical conductor cable 18 supporting the calipering device 11 passes over a sheave 20, which is suspended from a support arm 21, and is then wound on a storage and hoist drum 22 which may be actuated by any suitable means. The signal coming up the cable 18 is transferred therefrom by means of slip rings 23 and thence to an amplifier 24 at which point an alternating or direct current power source 25 may be connected.

As schematically shown in Figure 1, one portion of the amplified signal is transmitted to the recording potentiometer 14 having a pen or light beam 27 which records on a movable chart 28 a trace 30 which indicates variations in the diameter of the borehole with depth. The chart 28 of the potentiometer is driven by a motor 31 which is actuated by a depth signal received from a Selsyn generator 32 mounted on the sheave 20. Since the Selsyn generator 32 is rotated by the cable 18 as the calipering device is lowered into the well borehole or withdrawn therefrom, the position taken by the generator 32, motor 31 and chart 28 are all proportional to the level in the well at which the calipering device 11 is momentarily positioned.

The signal from the Selsyn generator 32 is also transmitted to a motor 33 of a ball-and-disk type integrating device. The motor 33 is provided with a shaft 34 on which a disc 35 is fixedly mounted to rotate in a horizontal plane when the motor 33 is energized. A pin 36 may be mounted on the disc 35 so as to contact and actuate the lever arm 37 of a counter 38 on each revolution of the disc. The position of the pin 36 with respect to the center of the disc is adjusted so that the counter 38 is actuated for each foot of change in position of the calipering device 11 in the well. Hence, at any moment the depth of the calipering device 11 within the well borehole can be read from the counter 38. The counter is preferably able to run in two directions so that the indicated depth on the counter 38 returns to zero as the calipering device is withdrawn from the well borehole.

Since the calipering device 11 transmits a signal proportional to the diameter of the well borehole, in order to obtain an integrated volume measurement of the borehole, it is necessary continuously to square this signal, multiply by a constant and then multiply by the depth of the well. The other portion of the amplified signal from the amplifier 24 is transmitted to the electronic squaring device 12. The squared signal is applied to a positioning potentiometer 40, that is, a type of potentiometer whose signal is used to set the position of a recorder, or, as in the present case, to energize a second motor 41 of the integrating device in accordance with changes in cross-sectional area of the well borehole.

A pinion 42 is mounted on the shaft 43 of the motor, the teeth of the pinion meshing with the teeth of a rack bar 44. The rack bar 44 is slidably mounted in a bearing 45 while a cage 46 is secured to the end of the rack. A ball 47 is rotatably positioned in the cage 46 in frictional contact with the lower face of rotating disc 35 and the top of a roller 48. The shaft 50 of the roller 48 is mounted in bearings 51 and 52 and is geared to a counter 53 which continuously records the volume of the borehole from the bottom up or from the top down depending upon where the calipering device was positioned at the start of a run.

In operation, the squared output signal of the calipering device 11 drives motor 41 in one direction or the other as variations in the diameter of the well borehole cause the caliper arms 16 to be radially extended or contracted. Thus, the motor-driven rack 44 and ball 47 are moved in one direction or the other parallel to the roller 48 as changes take place in the cross-sectional area of the well. If it is desired or necessary to multiply the squared signal from the positioning potentiometer 40 by a constant to obtain a true value for the cross-sectional area of the borehole, this is readily accomplished by selection of the proper sized pinion 42 to obtain the desired gear ratio.

The motor 33, when energized by the Selsyn generator 32, rotates the disc 35 and the motion thereof is transferred to the roller 48 by the ball 47, the amount of movement and speed of the roller 48 being controlled by the movement of the rack 44 in positioning the ball 47 relative to the disc 35. With the rotation of the roller and, consequently, of the shaft 50, the product of the well depth and the cross-sectional area, which is the volume of the borehole up or down to that well depth, is constantly recorded on counter 53 while well depth is registered on counter 38. If desired, the volume counter could be positioned directly over the chart 28 of the recording potentiometer and arranged so that the borehole volume would be printed on the chart at various depths, say at 10 foot intervals.

It is understood that any suitable electric circuit may be incorporated in the well calipering device 11 which produces an output signal proportional to variations in the diameter of the well borehole. The circuit employed by the calipering device is not part of the present invention but various examples of such a circuit may be found in U. S. Patent 2,340,987 to Robidoux, issued February 8, 1944, and U. S. Patent 2,497,990 to Huber et al. issued February 21, 1950. It is also realized that either electrical, electronic or mechanical devices may be employed for squaring the output signal from the well calipering device 11.

Figure 4:
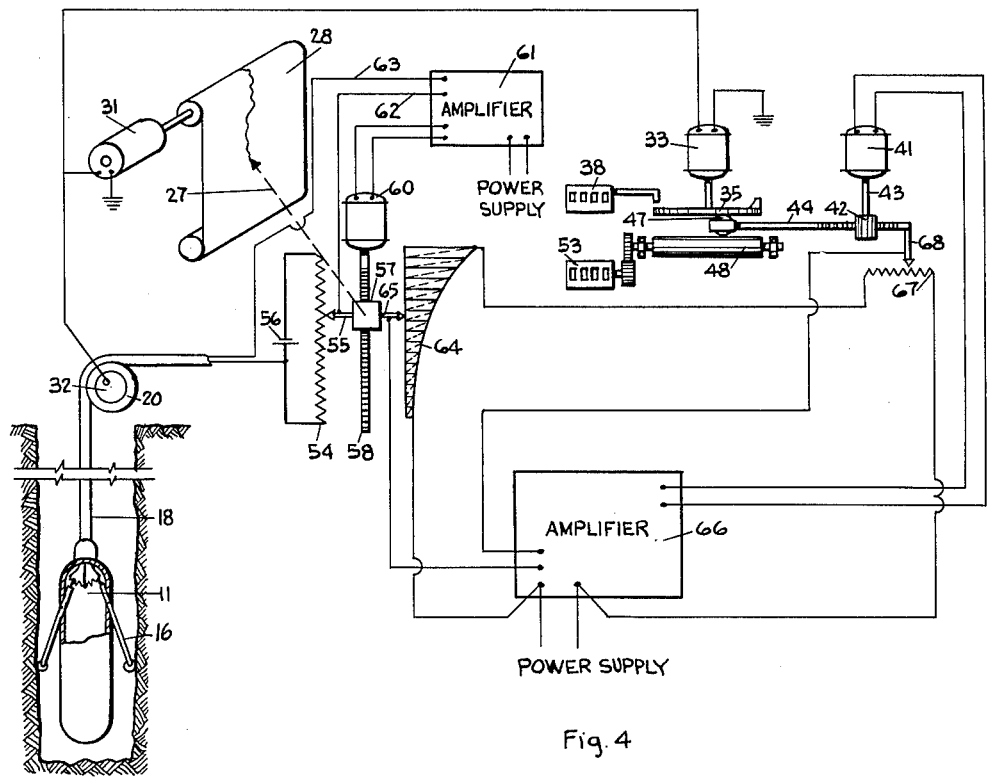

Both the electronic squaring device 12, shown diagrammatically in Figure 1, and an electrical squaring device as described hereinbelow, are well known to the art. Referring to Figure 4, if the well calipering device 11 incorporates a transmitting potentiometer within its housing which transmits a signal proportional to the well diameter, there may be employed at the surface a self-balancing recording potentiometer comprising slide wire 54 and sliding contact 55 with the circuit being powered by a battery 56.

The sliding contact 55 is secured to a carriage 57 which in turn is mounted on a lead screw 58 driven by motor 60 in one direction or the other on a signal from amplifier 61 which signal is proportional to changes in diameter of the well borehole. The amplifier 61 is also electrically connected to the sliding contact 55 and to the transmitting potentiometer in the calipering device 11 by leads 62 and 63, respectively. The carriage 57 is mechanically linked to the pointer 27 as shown by broken line, whereby the pointer 27 draws a trace on chart 28 proportional to the borehole diameter. Instead of potentiometer 54 having a linear resistance vs. motion, the potentiometer could be wound so that the electrical output of the potentiometer would be proportional to the square of the diameter signal received from the calipering device 11, whereby the cross-sectional area of the well borehole rather than its diameter would be traced on chart 28.

A potentiometer of the above-described type is shown in Figure 4 as comprising slide wire 64 and a sliding contact 65 secured to the movable carriage 57. The signal squaring potentiometer is electrically connected in a circuit with an amplifier 66 and a second self-balancing potentiometer consisting of a slide wire 67 and a sliding contact 68 secured to the end of the rack 44 and movable therewith. The self-balancing potentiometer 67 drives motor 41 to give rack 44 and ball 47 a position proportional to the square of the diameter signal. The potentiometer 67 puts out a signal of reversed polarity which increases until it equals the signal from potentiometer 64—65 thus causing motor 41 to come to a fixed position.

The other components of the system shown in Figure 4 are similar to those illustrated in Figure 1 with the Selsyn generator 32 mounted on sheave 20 for driving the chart motor 31 of the recording potentiometer and the motor 33 which rotates disc 35 of the integrating device, both motors 31 and 33 being energized to rotate proportionally to the depth to which the calipering device 11 is raised or lowered. In a like manner the well depth is recorded on counter 38 while the volume of the borehole is continuously registered on counter 53.

A modification of the present apparatus may be employed for determining the volume of a well borehole from a diameter-log which had been previously recorded by a borehole caliper. A diameter-log of a well borehole is the chart on which a trace of well diameter vs. well depth has been drawn by an electrical recording instrument actuated by a well calipering device.

Figure 2:
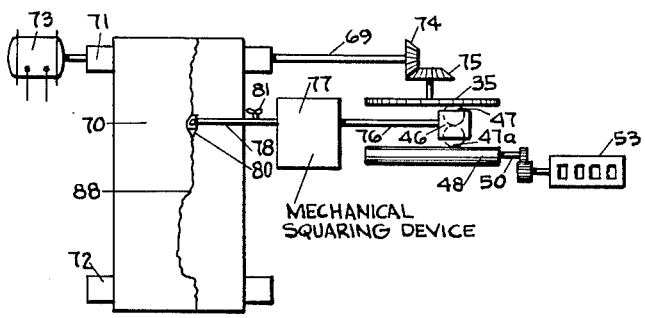
Figure 2 is a diagrammatic view showing the present integrating and squaring devices when employed for calculating borehole volumes from a previously drawn log bearing a diameter vs. depth trace.

As schematically shown in Figure 2, a diameter-log 70 of a well borehole may be rolled from one mandrel 71 to another 72 either manually or by a motor 73. The mandrel 71 has a shaft 69 extending therefrom, on which a gear 74 is secured. The gear 74 meshes with a second gear 75 to drive a rotating disc 35 similar to that shown in Figures 1 and 4. Rotation of the disc 35 rotates a pair of balls 47 and 47a which are in frictional contact with each other and with the disc 35 and roller 48 of the integrating apparatus. The shaft 50 of the roller 48 is geared to a counter or borehole volume totalizer 53.

The balls 47 and 47a are surrounded by cage 46 which is fixedly secured to the end of the output rod 76 of a mechanical squaring device 77 and movable therewith. A second rod 78 extends from the squaring device 77, the rod being provided with a pointer 80 and a handle 81. The mechanical squaring device 77 may be of any suitable type containing the necessary gears, cams and/or linkages so that movement of the output shaft 76 is proportional to the square of the movement of the input shaft 78.

Figure 3:
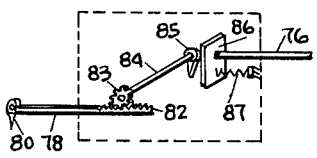
Figure 3 is a schematic diagram illustrating a mechanical squaring device.

A schematic view of a mechanical squaring device is shown in Figure 3. The input shaft 78 having a pointer 80 at one end is provided with a rack 82 at the other end which meshes with a gear 83 secured to a shaft 84. Fixedly secured to the shaft 84 is a cam 85 which is in contact with and movable against a plate 86 secured at one end of the output rod 76. A spring 87 is provided to keep the plate 86 in contact with the cam 85 at all times. The cam 85 is of a shape which will move plate 86 and output shaft 76 a distance equal to the square of the distance which the input shaft moves.

In operation, when the volume of a well borehole is to be calculated from a diameter-log containing the recorded signal from a borehole calipering device, the log 70 is rolled on or unrolled from mandrel 71 while the pointer 80 on arm 78 is moved back and forth manually by means of handle 81 in order to follow the irregular trace 88 on the log chart 70. The unrolling of the chart transmits rotary motion from mandrel 71 shaft 69 and gear 74 to gear 75, disc 35, balls 47 and 47a and thence to roller 48 which, being geared to counter 53, actuates the counter 53 on which the volume of the borehole is recorded. As the pointer 80 is moved with variations of the recorded borehole diameter, this movement is transmitted by shaft 78 through the mechanical squaring device 77 and thence to shaft 76 whereby balls 47 and 47a are moved horizontally in proportion to the square of the borehole diameter. The device is therefore adapted to calculate readily the borehole volume as the rotating mandrel 71 and shaft 69 put the depth signal into the integrating apparatus. In this modification of the present invention the signal from a borehole calipering device, which has been previously recorded, is put into the squaring device 77 by manually following the trace 88 on the chart 70 with pointer 80, whereas in the arrangements described with regard to Figures 1 and 4 the signal from the well calipering device 11 was transmitted directly to an electrical or electronic squaring device.

Instead of employing the mechanical integrating device 13 and the potentiometer 40 shown in Figure 1, a circuit containing electronic integrating means may be used. Such a circuit is shown in Figure 5 as comprising a variable frequency oscillator 90 and a fixed frequency oscillator 91 electrically connected to a mixer 92.

The voltage output signal of the variable frequency oscillator 90 is proportional to the borehole or formation property being measured by the well instrument 93 as it is moved through the well borehole. The present circuit may be used to integrate the product of the borehole depth and any borehole property such as borehole temperature, electrical resistivity, radioactivity, etc. For purposes of illustration, the present circuit is described when employed in integrating the product of the depth interval and the borehole area.

In the circuit of Figure 5, a signal voltage (e. g. $E=K \times$ bore area) from the well instrument 93, directly proportional to the borehole area, is transmitted up the cable 94 to the potentiometer 95 of the chart recorder and also to the variable frequency oscillator 90 whose frequency it is used to control. The output of the variable frequency oscillator 90 (e. g., $F'=f_0+K'E$) serves the mixer section 92 where it is mixed with the output of the fixed frequency oscillator 91 to obtain a beat frequency. If the fixed frequency oscillator is set so that the frequencies from the two oscillators 90 and 91 are equal when the borehole area is zero, then the output frequency of the mixer 92 will vary directly as a function of the borehole area.

The output from the mixer 92 is transmitted to a gate circuit 96 which is actuated by a trigger circuit 97. The trigger circuit is actuated from the chart drive motor 98 at a rate such for example as one pulse per foot of the borehole traversed. The function of the trigger circuit 97 is to actuate the gate 96 for a fixed time interval every time the trigger is pulsed. Since the chart drive motor 98 is driven in synchronism with the cable measuring sheave 99, the number of pulses which pass the gate depends on both the borehole area and the change in depth of the well caliper 93 and hence is directly proportional to the borehole volume traversed.

Since the number of pulses passing through the gate 96 is large, it is preferably scaled down by a factor of 10 or more by a decade scaler circuit 101. The output pulses from the scaler circuit actuate a solenoid-operated mechanical counter 102. A printer solenoid 103 associated with the counter 102 is actuated by a pulse from the chart drive 98 once every 50 or 100 feet of borehole traversed. Mechanical counters 102 and printers 103 are well known to the art and may be arranged to print directly on the recording chart 95.

In cementing operations it is often desirable to know the volume of the annulus between the borehole wall and a well casing of known diameter which is to be inserted in the borehole and cemented therein. In the circuit shown in Figure 5, the frequency of the fixed oscillator 91 may be advanced to a value such that the frequencies of the two oscillators 90 and 91 are equal when the spread of the well caliper 93 is equal to outer diameter of the well casing. The instrument then integrates the annular volume outside the well casing to be filled with cement.

We claim as our invention:

1. Apparatus for determining the volume of a well borehole comprising in combination a borehole calipering device lowerable into a well borehole, an electrical conductor cable supporting said calipering device in the borehole, said calipering device having flexible arms adapted to contact the wall of the borehole, electrical circuit means in said device operable in response to movement of said arms for transmitting up said cable a signal proportional to the diameter of said borehole, means electrically connected to said cable for squaring said diameter signal, an integrating device comprising a rotatable disc, a motor for rotating said disc, a cylinder element mounted adjacent the disc and extending substantially diametrically of said disc in spaced relationship thereto, a rack bar element mounted between said disc and cylinder and for reciprocation parallel to the axis of said cylinder, a ball carried by said rack bar in frictional contact with said disc and cylinder and movable toward and away from the center of said disc for changing the speed ratio between the disc and the cylinder, a second motor connected to said bar element, electrical circuit means for applying to said second motor the squared signal from said squaring device, generator means coupled to said cable for generating a signal proportional to the depth of the calipering device within the borehole, means for transmitting said signal connected between said generator and the motor rotating the disc, and indicator means engaging said cylinder for continuously registering the volume of the borehole.

2. Apparatus for determining the volume of a well borehole comprising in combination a borehole calipering device lowerable into a well borehole, an electrical conductor cable supporting said calipering device in the borehole, said calipering device having flexible arms adapted to contact the wall of the borehole, variable resistance means in said device operable in response to movement of said arms for transmitting up said cable a signal proportional to the diameter of said borehole, means electrically connected to said cable for squaring said diameter signal, an integrating device, comprising a rotatable disc, a motor for rotating said disc, a cylinder element mounted adjacent the disc and extending substantially diametrically of said disc in spaced relationship thereto, a rack bar element mounted between said disc and cylinder and for reciprocation parallel to the axis of said cylinder, a ball carried by said rack bar in frictional contact with said disc and cylinder and movable toward and away from the center of said disc for changing the speed ratio between the disc and the cylinder, a second motor connected to said bar element, potentiometer means for applying to said second motor the squared signal from said squaring device, generator means coupled to said cable for generating a signal proportional to the depth of the calipering device within the borehole, electrical cable means for transmitting said signal connected between said generator and the motor rotating the disc, and indicator means engaging said cylinder for continuously registering the volume of the borehole traversed by said calipering device.

3. Apparatus for determining the volume of a well borehole comprising in combination a borehole calipering device lowerable into a well borehole, an electrical conductor cable supporting said calipering device in the borehole, said calipering device having flexible arms adapted to contact the wall of the borehole, variable resistance means in said device operable in response to movement of said arms for transmitting up said cable a signal proportional to the diameter of said borehole, means electrically connected to said cable for squaring said diameter signal, an integrating device comprising a rotatable disc, a reversible motor for rotating said disc, a cylinder element mounted adjacent the disc and extending substantially diametrically of said disc in spaced relationship thereto, a rack bar element mounted between said disc and cylinder and for reciprocation parallel to the axis of said cylinder, a ball carried by said rack bar in frictional contact with said disc and cylinder and movable toward and away from the center of said disc for changing the speed ratio between the disc and the cylinder, a second reversible motor connected to said bar element, electrical circuit means for applying to said second motor the squared signal from said squaring device, generator means coupled to said cable for generating a signal proportional to the depth of the calipering device within the borehole, means for transmitting said signal connected between said generator and the motor rotating the disc, indicator means engaging said cylinder for continuously registering the volume of the borehole, and recording potentiometer means electrically connected to said signal squaring means for drawing a depth vs. cross-sectional area of the borehole, traversed by the borehole calipering device.

References Cited in the file of this patent

UNITED STATES PATENTS

| | | |
|---|---|---|
| 2,415,636 | Johnson | Feb. 11, 1947 |
| 2,614,164 | Huston | Oct. 14, 1952 |
| 2,636,383 | Moore et al. | Apr. 28, 1953 |
| 2,656,613 | Goble | Oct. 27, 1953 |

FOREIGN PATENTS

| | | |
|---|---|---|
| 33,162 | Sweden | June 10, 1912 |
| 911,746 | France | Apr. 1, 1946 |